United States Patent
Palazzo et al.

(10) Patent No.: US 11,700,407 B2
(45) Date of Patent: Jul. 11, 2023

(54) PERSONAL MEDIA CONTENT INSERTION

(71) Applicant: AT&T Intellectual Property I, L.P., Atlanta, GA (US)

(72) Inventors: Richard Palazzo, Stewartsville, NJ (US); Brian M. Novack, St. Louis, MO (US); Rashmi Palamadai, Naperville, IL (US); Tan Xu, Bridgewater, NJ (US); Eric Zavesky, Austin, TX (US); Ari Craine, Marietta, GA (US); Robert Koch, Peachtree Corners, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 17/541,140

(22) Filed: Dec. 2, 2021

(65) Prior Publication Data

US 2023/0179816 A1 Jun. 8, 2023

(51) Int. Cl.
*H04N 21/2668* (2011.01)
*H04N 21/845* (2011.01)
*H04N 21/431* (2011.01)
*H04N 21/258* (2011.01)

(52) U.S. Cl.
CPC ... *H04N 21/2668* (2013.01); *H04N 21/25891* (2013.01); *H04N 21/4316* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 2009/0328113 | A1* | 12/2009 | van de Klashorst | ........................ G06Q 30/0269 725/87 |
| 2014/0002644 | A1* | 1/2014 | Fedorovskaya | ...... H04N 21/466 348/143 |
| 2014/0189733 | A1* | 7/2014 | Anguiano | ........ H04N 21/25841 725/35 |
| 2018/0160158 | A1* | 6/2018 | Liu | .................. H04N 21/44218 |
| 2020/0089702 | A1* | 3/2020 | Chapps | ................ H04N 21/458 |
| 2020/0228880 | A1* | 7/2020 | Iyer | .................. H04N 21/23424 |
| 2022/0141515 | A1* | 5/2022 | Grover | ............... H04N 21/2343 725/32 |

* cited by examiner

*Primary Examiner* — Jason K Lin
(74) *Attorney, Agent, or Firm* — Amin, Turocy & Watson, LLP

(57) ABSTRACT

The disclosed technology is directed towards inserting user-personalized or other user-related supplementary media content into primary media content being presented to the user. The personalized media content can be inserted into available insertion slots associated with the primary media content. The inserted content is based on the context of the primary media, e.g., a location or theme of a movie scene. For example, upon obtaining primary media content that is video, supplementary media content related to a group of frames of the primary media content can be determined. Supplementary media content is combined with the primary media content at a presentation position associated with the group of frames to output modified media content. For a video, for example, the supplementary content can be inserted between scenes, overlaid onto a scene, or presented proximate a scene.

20 Claims, 15 Drawing Sheets

PERSONAL MEDIA CONTENT INSERTION

TECHNICAL FIELD

The subject application relates to the presentation of media in general, and more particularly to presenting media content to which a user can relate, and related embodiments.

BACKGROUND

Contemporary users of media are often not particularly interested in the advertising that interrupts many movies and television programs, as well as games and audio content. Any way for the presenter of the media content to keep a user more engaged as an active consumer of the media content would be of value to the media presenter.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
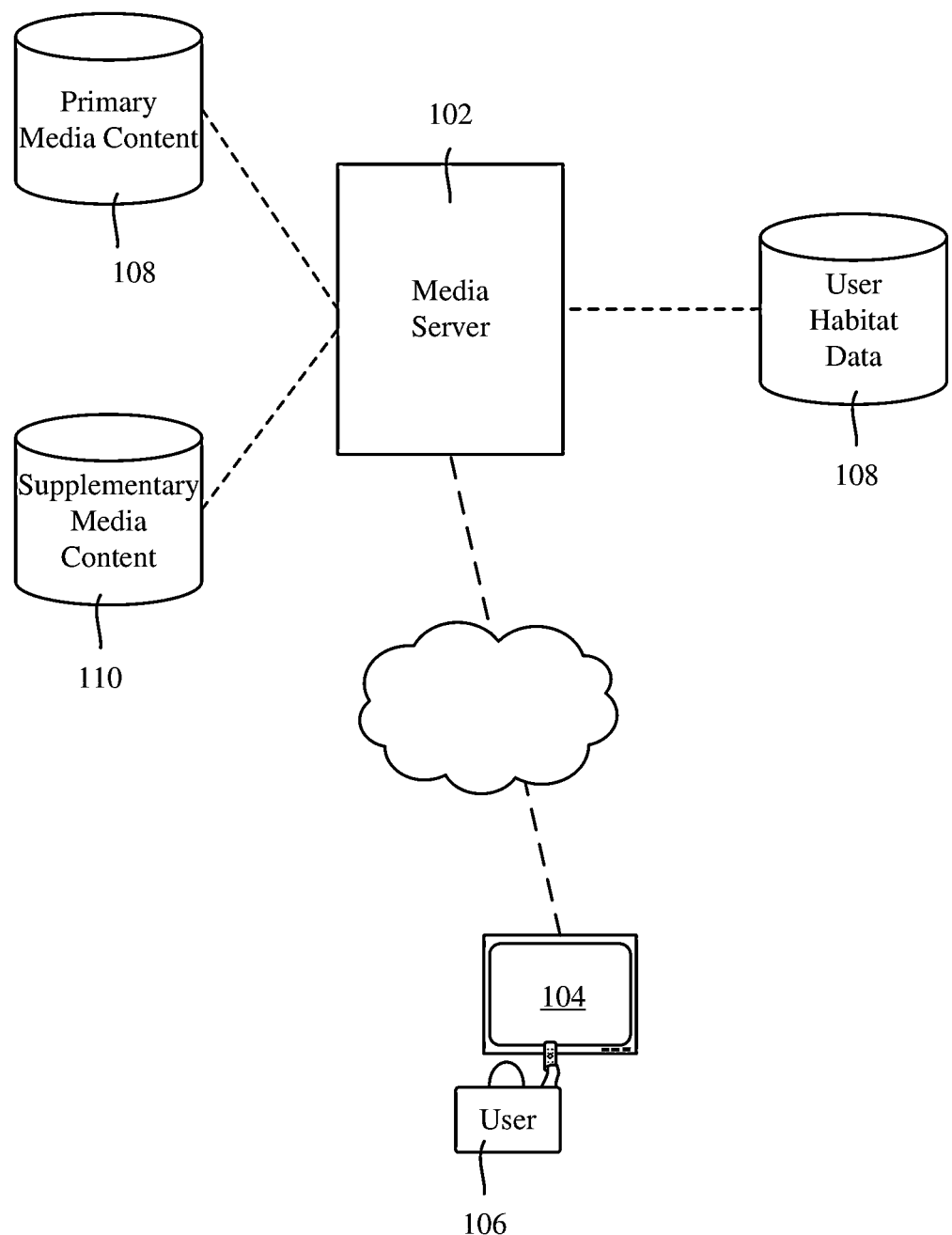
FIG. 1 is a block diagram of an example system for combining supplementary media content into a primary media content presentation, in accordance with various aspects and embodiments of the subject disclosure.

The technology described herein is generally directed towards facilitating the insertion of personalized (or other) supplementary media content into a user's experience of consuming media of a primary media content presentation, such as video, audio, or games. In one implementation, the personalized media content is inserted into available insertion slots associated with the primary media content, and uses inserted content that is found based on the context of the media. The personalized media content can be media based on a user's past historical experiences, e.g., in terms of a physical habitat in which the user exists.

As can be appreciated, the combining of personalized supplementary media content with a primary media content presentation provides a more engaging media experience to users, which allows them to more personally relate to the primary media being presented. In general, this keeps a user more engaged as an active consumer of the content.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows a media server 102 that provides primary media content to a media presentation device 104 of a user 106. The primary media content may be, for example, video, audio, a game, or other. The primary media content may be provided by the media server 102, such as retrieved on request of the user from a primary media content data store 108, e.g., on demand.

As set forth herein, the insertion of personalized and context relevant content may make the media experience more engaging for the user 106. Such supplementary content, e.g., obtained from a supplementary media content data store 110, also may be used to encourage the user to be more actively involved when consuming the media; for example, by watching for familiar content elements, the user may be encouraged to more actively consume content such as advertisement content. The personalized and/or context relevant content may be based on a user's historical experience data, represented in FIG. 1 as habitat data maintained in a user habitat data store, e.g., as database records or the like.

Figure 2:
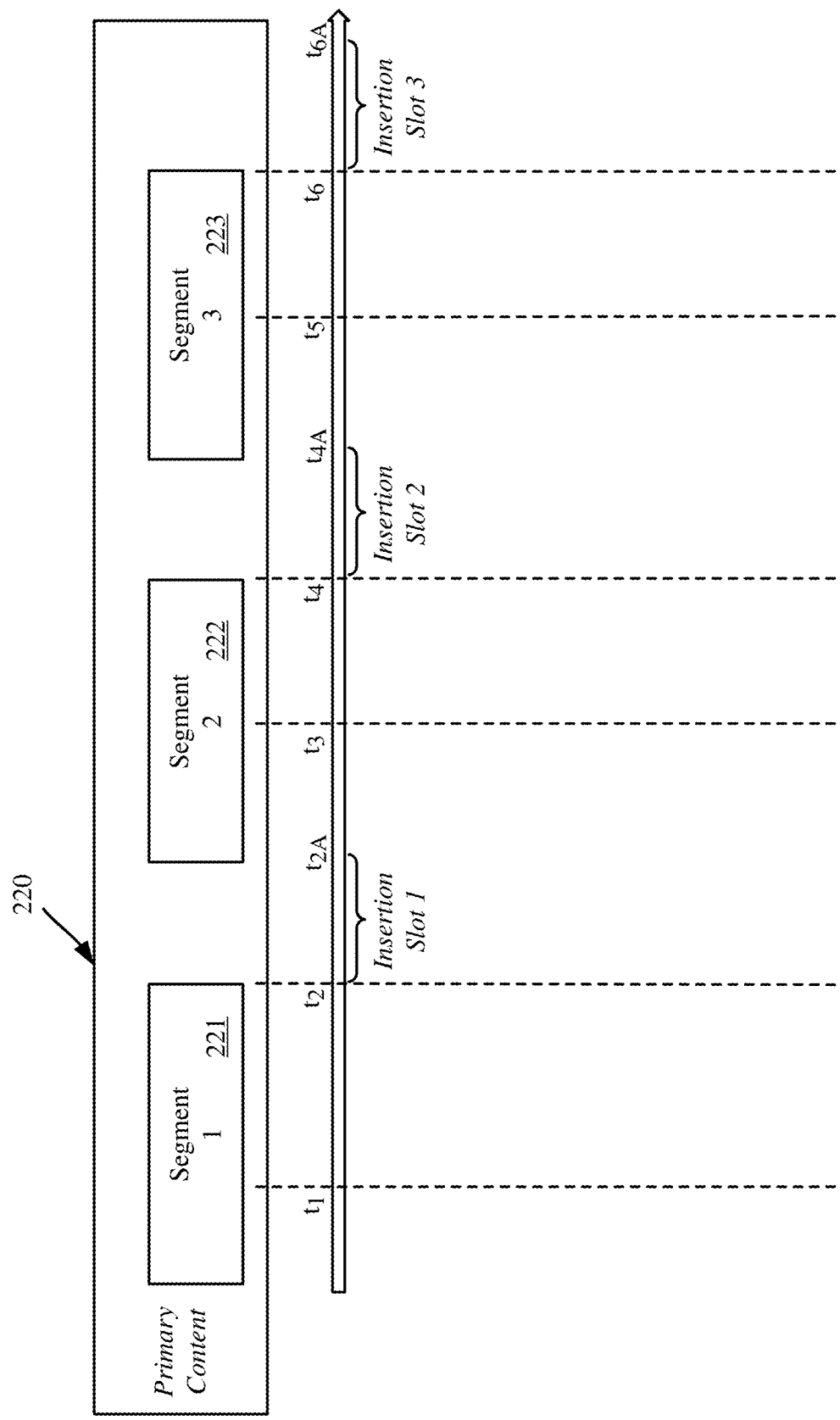
FIG. 2 is an example representation of segments of primary media content, in accordance with various aspects and embodiments of the subject disclosure.

As represented in FIG. 2, the primary media content 220 may be comprised of segments 222-224 (e.g., video frames comprising scenes) that are presented to the user over a period of time. The primary content 220 may include metadata that describes the content. The metadata also may describe insertion slots (e.g., insertion slots 1-3 in FIG. 2) that are available for supplementary content to be inserted. The insertion slot metadata may include a duration of each insertion slot, and may be used to describe any requirements for any content that would be inserted for a period that comprises the duration of the insertion slot.

Figure 3:
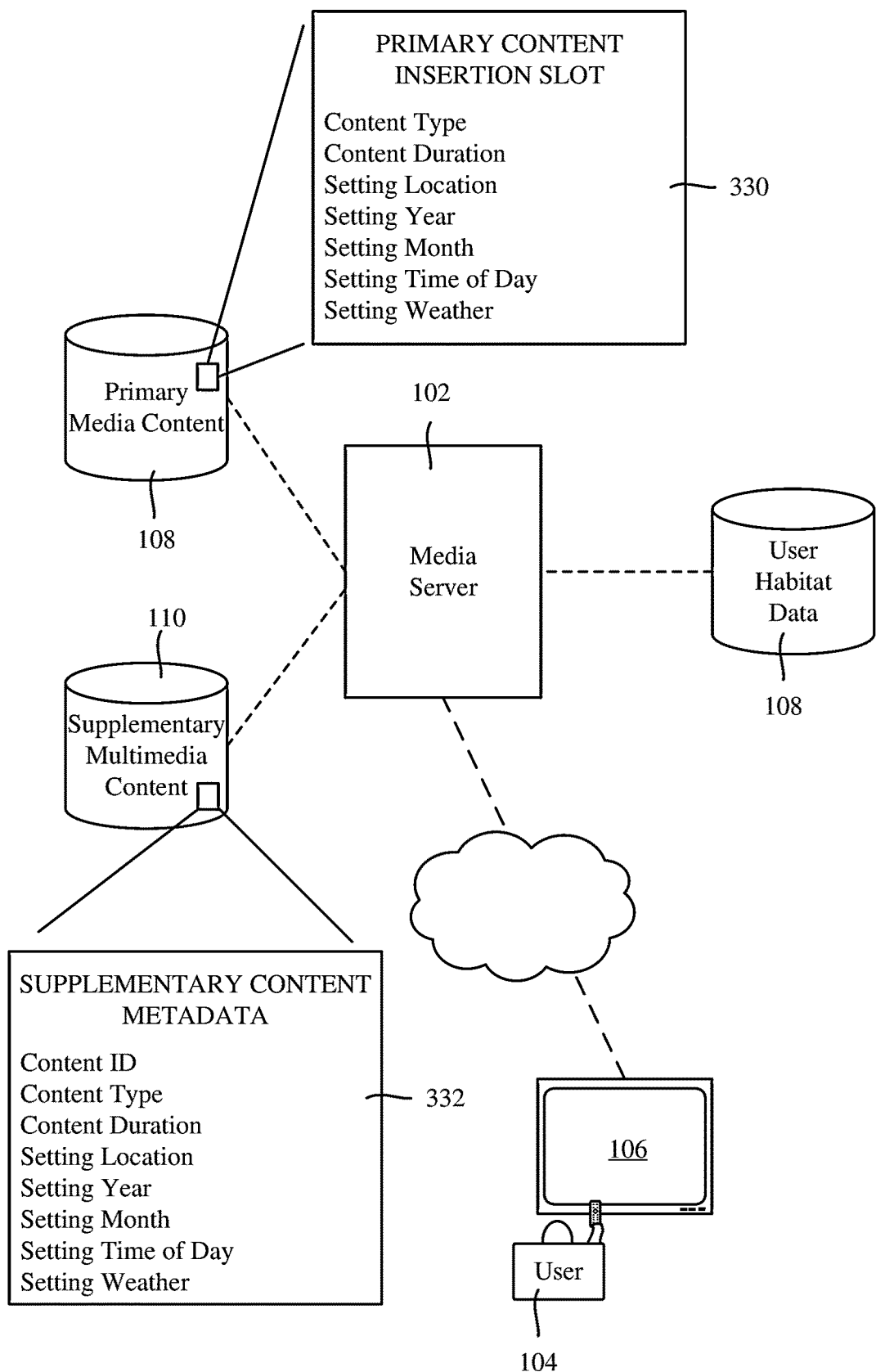
FIG. 3 is a block diagram of an example system for combining supplementary media content into a primary media content presentation, in which various data structures facilitate the combining, in accordance with various aspects and embodiments of the subject disclosure.

By way of example as shown in FIG. 3, if the user is viewing video content, such as a movie, the primary content insertion slot data may include data such as represented in data structure 330. This data may specify the requirements (or possibly suggestions) for content that may be retrieved from the supplementary media content data store 108 and used to insert into the insertion slot defined by the data structure 330. Note that although not explicitly shown in FIG. 3, it is understood, that the insertion slot data contains information as to where the insertion slot begins, e.g., a frame number for video, a time value relative to the start of audio, a point in a game, or the like.

In making the content insertion, a general objective may be to make the media consumption experience more personalized for the user. For instance, if the content being viewed is a movie scene that is set in a geographic location that the user has previously visited, some scenes may be arranged to include visuals that the user is more likely familiar with around that location, because the user has been there in the past.

As also shown in FIG. 3, one or more sources of supplementary content may also exist in the supplementary content data store 108. This may include, for example, video clips of various durations. As represented by the data structure 332, each such video clip may include supplementary content metadata that is descriptive of the supplementary video content, as shown as an example. Supplementary audio content also may be available, as described herein.

Figure 4:
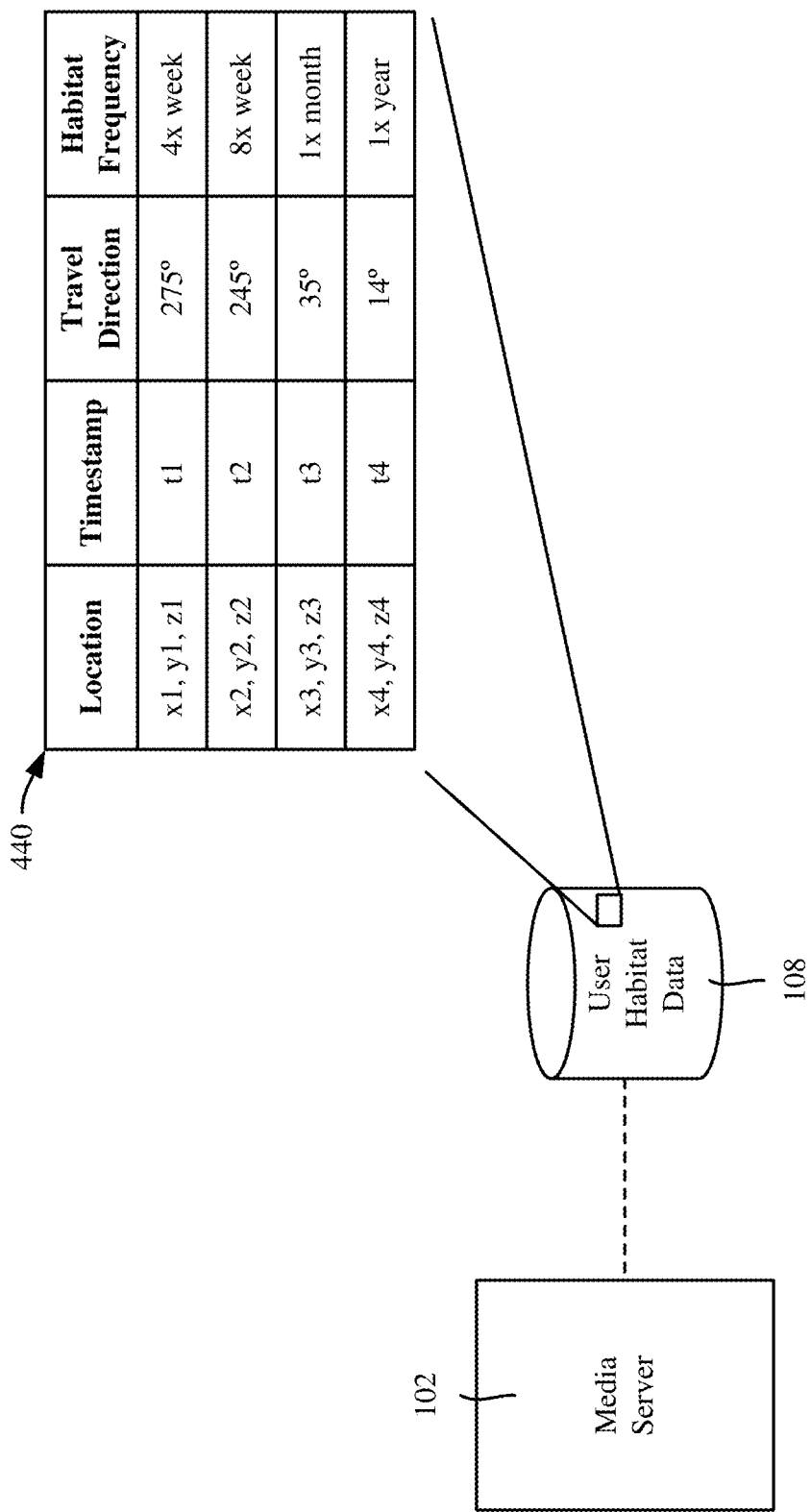
FIG. 4 is a block diagram of an example data structure that includes user historical/habitat data, in accordance with various aspects and embodiments of the subject disclosure.

FIG. 4 shows an example representation of the data store 108 user historical (e.g. habitat) data to which the media server 108 is coupled to access its data. For example, the user may be registered for a media consumption session via a user identifier (ID). The user ID also may be used to access user habitat data specific to that user.

As represented in the example data structure 440, the user habitat data may be a collection of data over a period of time, perhaps even years, that contains records of historical location information for the user over that time. This data may be collected by a device such as a smartphone or other device that the user has with them over that period of time. The user also may manually enter such data, such as to correspond with a video the user took via a video camera years ago, (e.g., vacation in Tennessee in 1997). The user habitat data may include location points and/or ranges of points, timestamps and/or durations of time, direction of travel within those location points, and an aggregate summary of how frequently the user is in each location and/or range of location points. As such, this data 440 represents a picture of the user's frequent daily habitat as well as their travels outside of their frequent habitat. A user may delete some data entries for privacy or other reasons.

Figure 5:
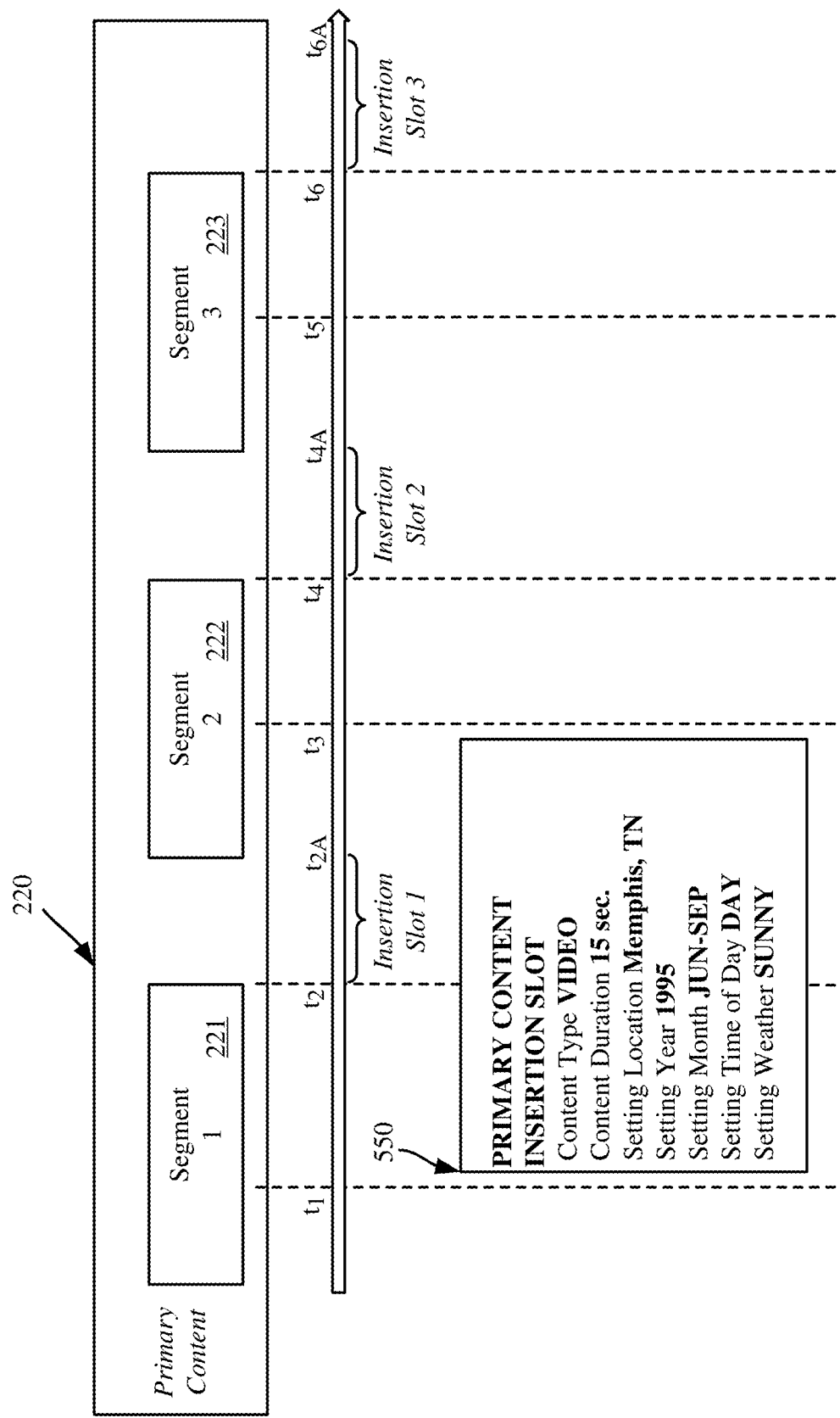
FIG. 5 is an example representation of segments of primary media content, in which a segment is associated with primary content insertion slot data, in accordance with various aspects and embodiments of the subject disclosure.

Turning to searching for supplementary content, with the primary content, the primary content insertion slot data/metadata, the supplementary content and its metadata, and the user habitat data accessible to the media server 102, the combination of these datasets may be used to search for supplementary insertion media content. As an example represented in FIG. 5 via the data structure 550, the insertion slot 1 may call for an exterior restaurant scene, at daytime, during the summer of 1995. The insertion slot "requirements" data may be represented as shown in the data structure 550.

Location requirements may be represented in a number of ways, such as a range of geographic location coordinates that comprise an area that may describe the setting for the movie, for instance, Memphis, Tenn. The media server 108 may use the insertion slot requirements and combine it with the user habitat data 440 (FIG. 4) that matches the requirements and search for a closest match of supplementary metadata content that meets the resulting query. For example, this may result in a search for an exterior video clip of the user's favorite hotel in Memphis. Note that the "requirements" can be considered suggestions to the media server 108; e.g., if the user's favorite hotel in Memphis was last visited by the user in 2013, the media server 108 may consider that data more significant for insertion purposes than a hotel in a different city but matching the summer of 1995 timeframe. The search criteria can be weighted, for example, to bias a location and type of place closeness match over a time closeness match.

It should be noted that location may not be relevant to the context of the primary media content. For instance, the movie scene, e.g., a scene in a restaurant, may not depend on the specific location to be relevant. In such a case, the search for supplementary content may simply search for a restaurant that the user visited while on vacation at any location, for example. Further, the location requirement may be presented more generically, such as "beachfront"—in which case, supplementary content from the user's most frequented beach may be retrieved.

Similarly, a theme can be the relevant search criterion. For example, if movie dialog is talking about food, or a character is shown heading out for a bite to eat, a video of the user at his favorite restaurant can be matched to the theme, even though no restaurant location is shown in the movie.

Figure 6:
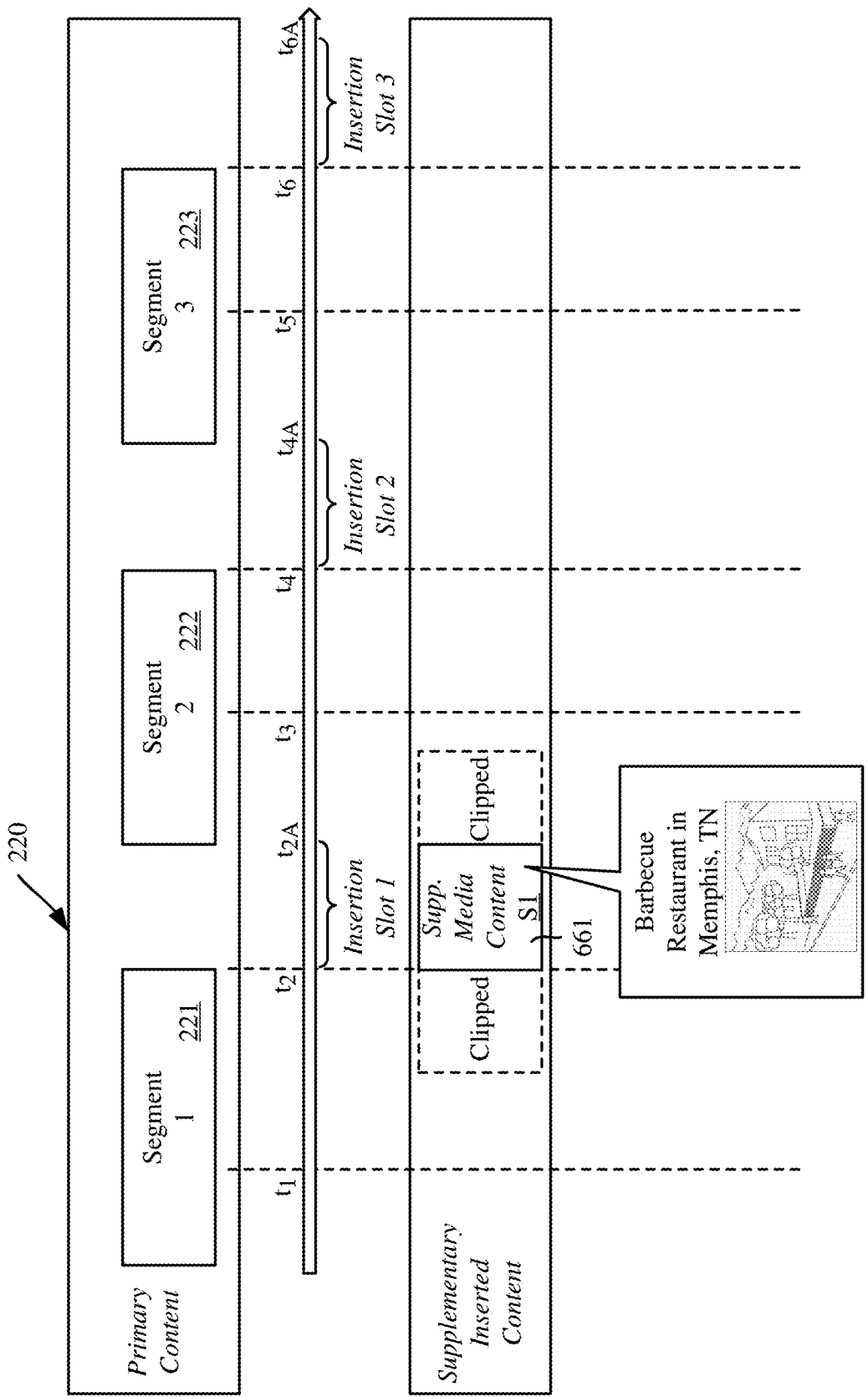
FIG. 6 is an example representation of segments of a primary media content presentation with supplementary media content configured for insertion into the presentation, in accordance with various aspects and embodiments of the subject disclosure.

Consider that for this example, as shown in FIG. 6 the supplementary media content 661 retrieved may be for a barbecue restaurant in Memphis. In the event that the video clip found as supplementary content may exceeds the fifteen seconds duration of insert slot one, as shown in FIG. 6, the media server 108 may clip the retrieved supplementary content 661 so as to fit the duration of the insertion slot between time $t_2$ and $t_{2A}$. If the retrieved supplementary content is not long enough in terms of duration, the supplementary content can be extended; for example, the last frame of video can be repeated, possibly with an effect such as fading out until the next primary segment is to start. It is also feasible to move up the playback of the next primary segment in time.

Figure 7:
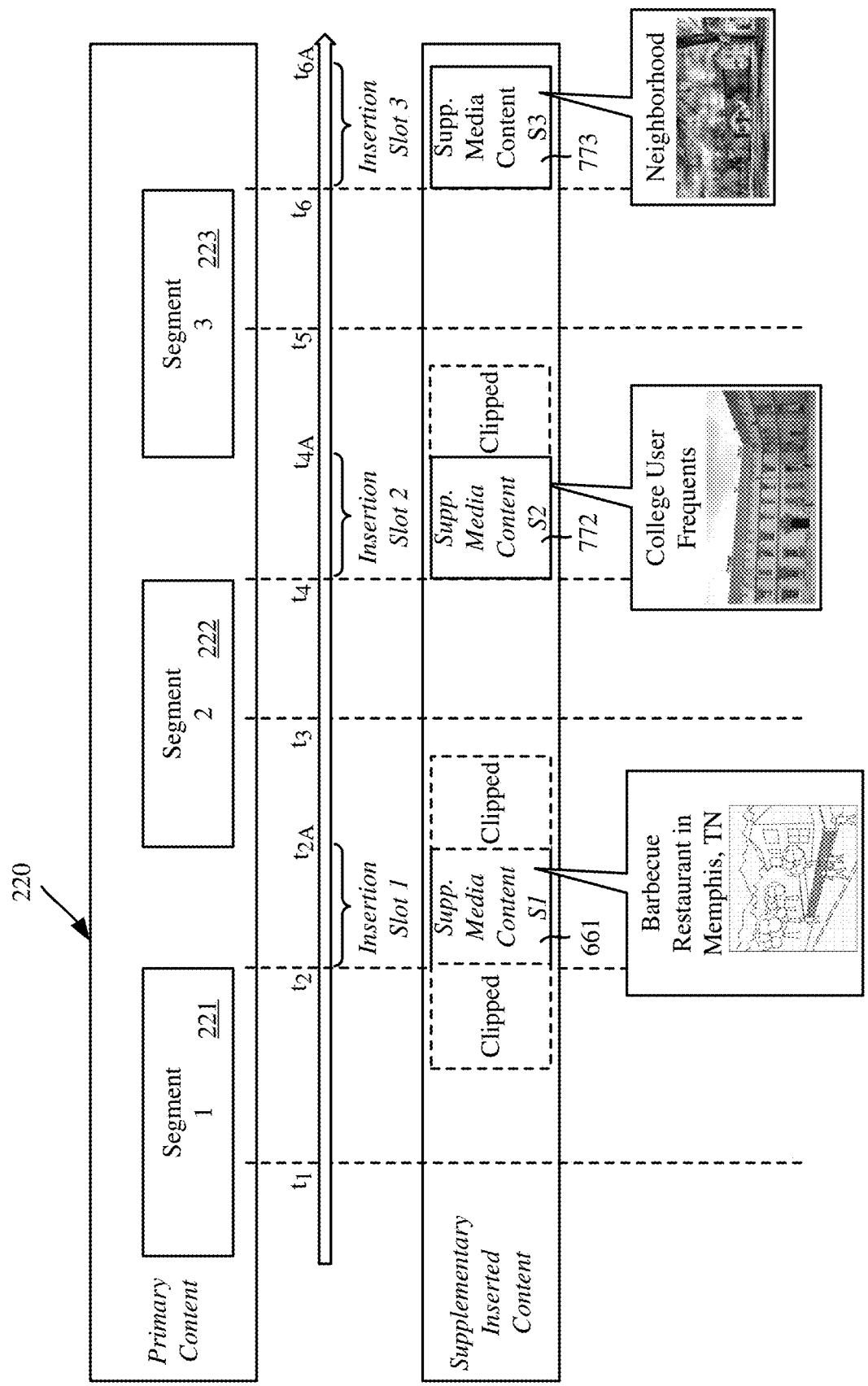
FIG. 7 is an example representation of segments of a primary media content presentation with supplementary media content configured for insertion into the presentation between the segments, in accordance with various aspects and embodiments of the subject disclosure.

As represented in the example of FIG. 7, in a similar manner, the media server 108 may search for and retrieve supplementary content associated with a primary scene of approaching a college (block 772), or a scene of driving through a neighborhood (block 773). In this case, the college may be one that the user attends or frequents, and the neighborhood maybe one in which the user lives or otherwise frequents. In such insertion cases, the media server 108 inserts the retrieved media for the duration of the insertion slot such that the primary content to supplementary content transitions are transparent to the user.

It also should be noted that supplementary content may not directly involve the user. For example, if the primary content is set in Spain, a video sent by a friend of the friend's family visit to Spain may be located. A wedding video of a close relative or friend can be inserted as supplementary content into a primary video presentation. The user can, for example, update her historical data store so that such supplementary content can be found.

Figure 8:
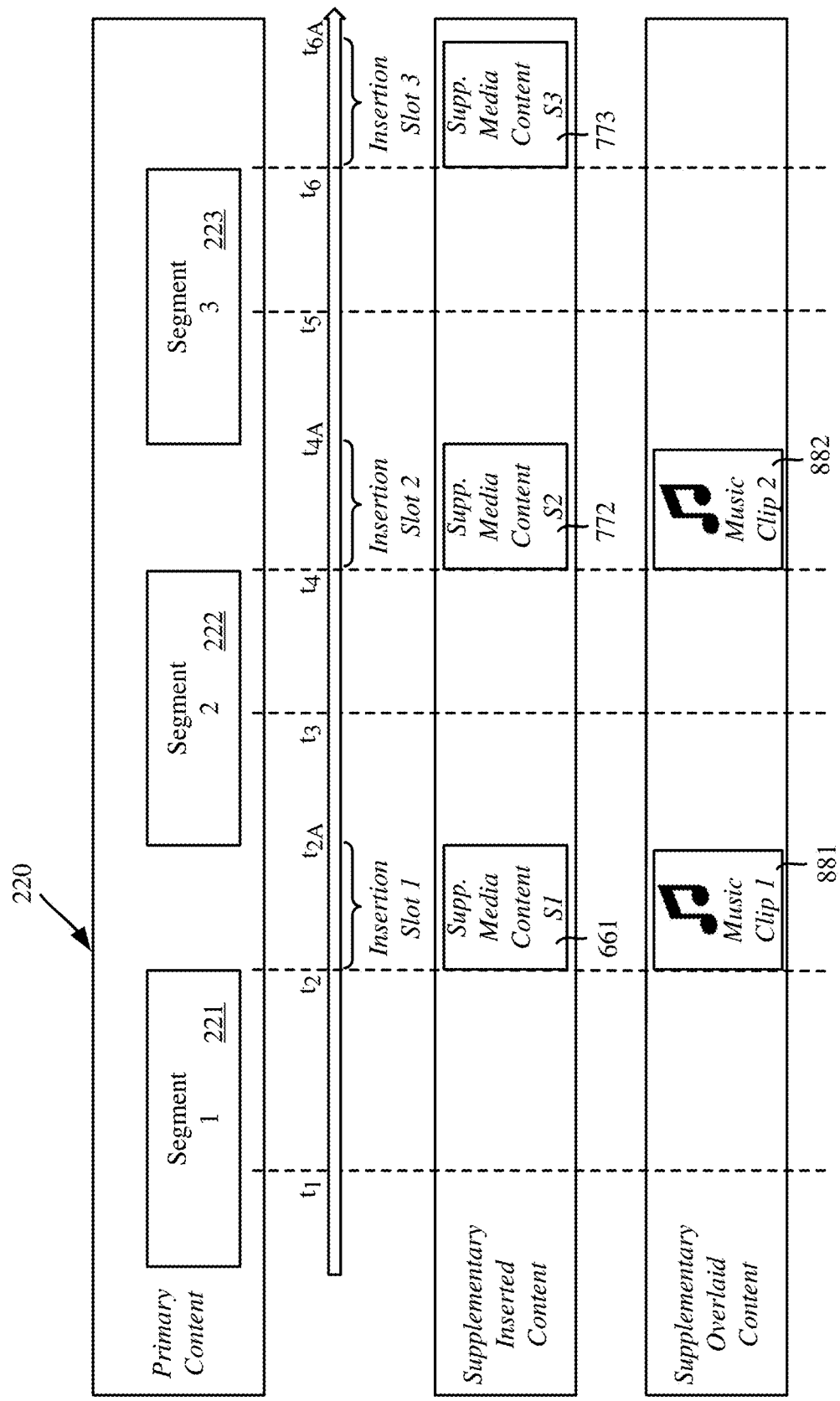
FIG. 8 is an example representation of segments of a primary media content presentation with supplementary media content configured for insertion into the presentation and supplementary content overlaid onto the presentation, in accordance with various aspects and embodiments of the subject disclosure.

As shown in FIG. 8, some inserted supplementary content for the primary video content may be supplementary audio content. For example, an insertion slot in the primary video content may arise that allows for the insertion of audio content. From the previous example of inserting a video clip in insertion slot one, supplementary audio content also may be used to provide a soundtrack (block 881) during insertion slot one. In this case, when the user was previously at the location of insertion slot one, if there was audio content being played at that time—either by the user's device or captured by the user's device, a record of that event may have been made and stored, such as a song ID, in the user habitat data. An audio clip of the same song ID may be retrieved and presented as the audio portion (block 881) of insertion slot one. In this manner, the user may be provided with not only a visual but an audio experience that is personalized based on their past history of events. In another example, insertion slot 2 may present an opportunity for the insertion of an audio clip of a band playing in a scene. In a like manner, a music clip (block 882) of a song that the user listened to around the time of the setting of the scene may be retrieved and played as soundtrack content during insertion slot 2.

Figure 9:
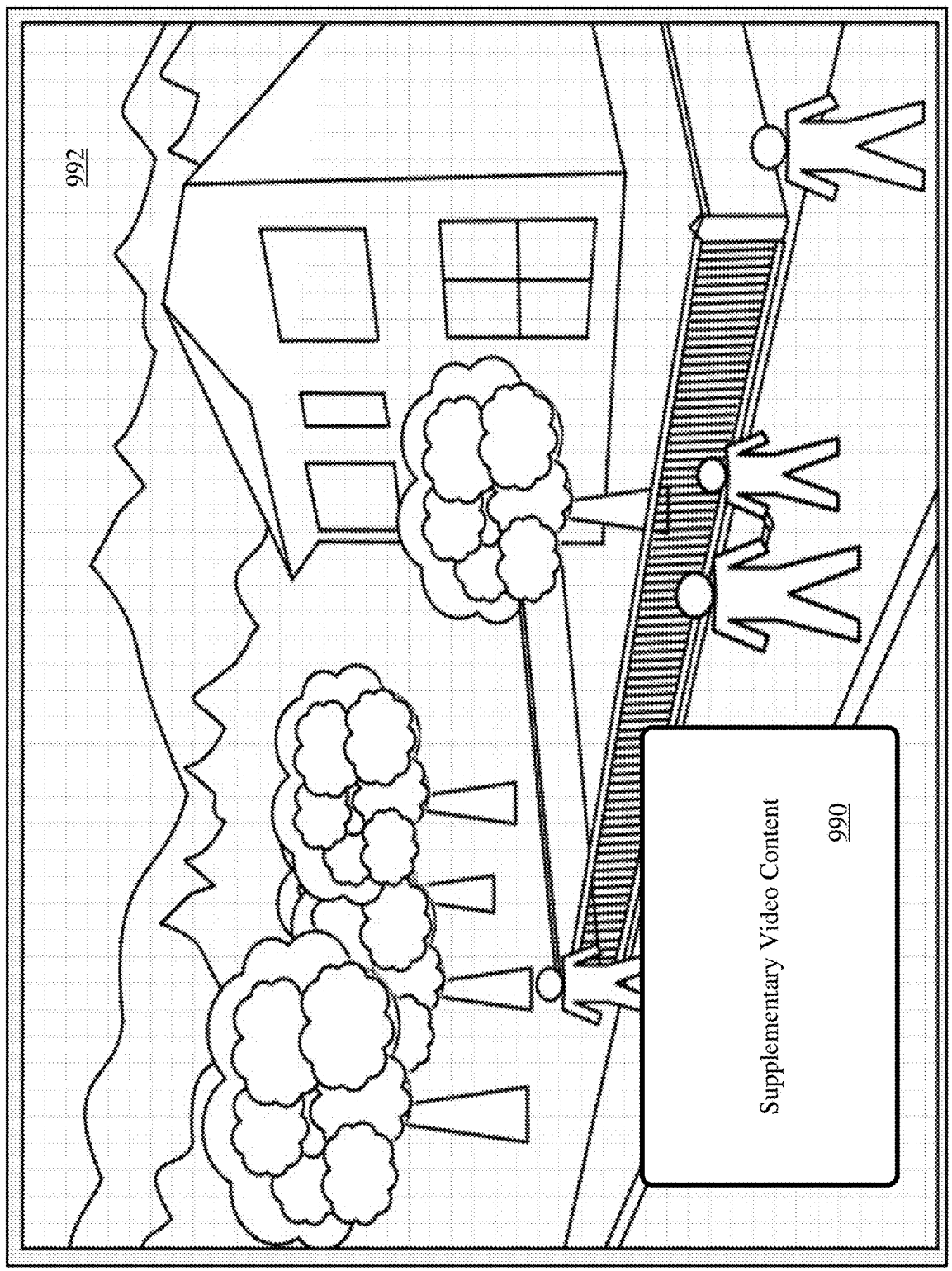
FIG. 9 is an example representation of primary media content video frame(s) combined with overlaid visible supplementary media content, in accordance with various aspects and embodiments of the subject disclosure.

It is also feasible to overlay supplementary video content on the primary video content. FIG. 9 shows combining visible supplementary content 990 with frames/a scene of primary video content 992 by overlaying ("picture-in-picture") the supplementary content 990 over a smaller portion of the primary content presentation. In this example, the insertion slot is a time slot that overlaps the primary media content, rather than being in between segments of the primary media content. The insertion slot metadata can specify relative size, screen position and so on for the presentation of the supplementary content 990. Along with the duration of the supplementary content 990 playback, a starting frame of the video content can also be specified in the overlapping insertion slot data.

Figure 10:
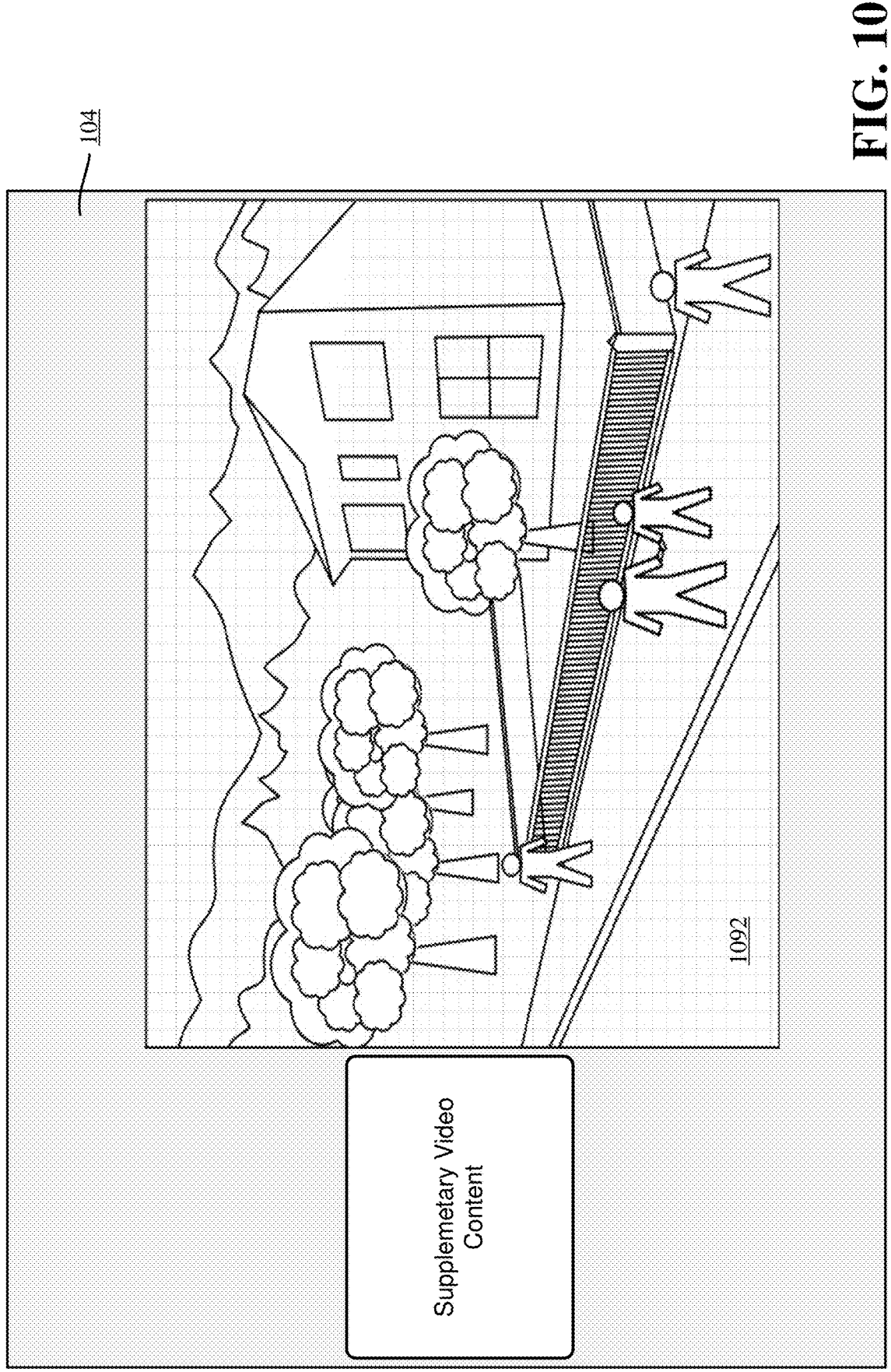
FIG. 10 is an example representation of primary media content video frame(s) combined with visible supplementary media content proximate the primary media content, in accordance with various aspects and embodiments of the subject disclosure

FIG. 10 shows a similar concept, with the supplementary content 1090 displayed in a "split-screen" output area, proximate (just left of) the primary content presentation 1092. The insertion slot data can describe the size and position of the supplementary content 1090 playback area, and size information (e.g., shrink vertically and horizontally to fit the media presentation device 104, or shrink horizontally only, or shrink vertically only if above or below the supplementary content 1090 playback area, and so forth. Along with the duration of the supplementary content 1090 playback, the insertion slot data can include the starting frame of the primary video content where the playback of the supplementary content 1090 is to begin.

Figure 11:
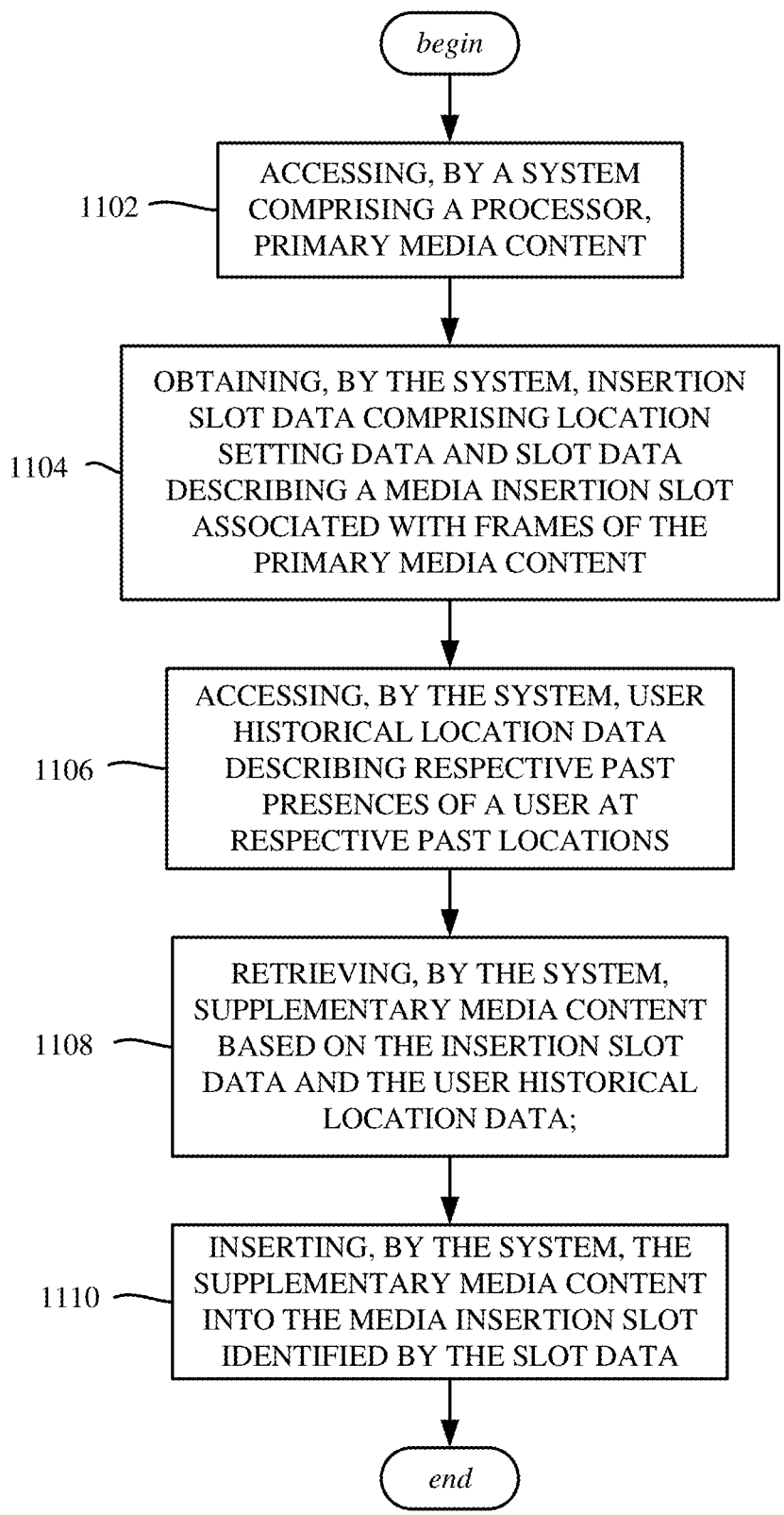
FIG. 11 is a flow diagram representing example operations related to inserting supplementary media content into a media insertion slot identified by slot data, in accordance with various aspects and embodiments of the subject disclosure.

One or more example aspects are represented in FIG. 11, and, for example, can correspond to operations, such as of a method. Example operation 1102 represents accessing, by a system comprising a processor, primary media content. Operation 1104 represents obtaining, by the system, insertion slot data comprising location setting data and slot data describing a media insertion slot associated with frames of the primary media content. Operation 1106 represents accessing, by the system, user historical location data describing respective past presences of a user at respective past locations. Operation 1108 represents retrieving, by the system, supplementary media content based on the insertion slot data and the user historical location data. Operation 1110 represents inserting, by the system, the supplementary media content into the media insertion slot identified by the slot data.

Operations can include clipping, by the system, the supplementary media content to fit a time duration of the media insertion slot.

The location setting data of the insertion slot data can include location type data that describes a type of location.

The location setting data of the insertion slot data can include geographical location data that describes a geographic location.

Accessing the primary media content can include accessing video data, and retrieving the supplementary media content can include retrieving audio data.

Figure 12:
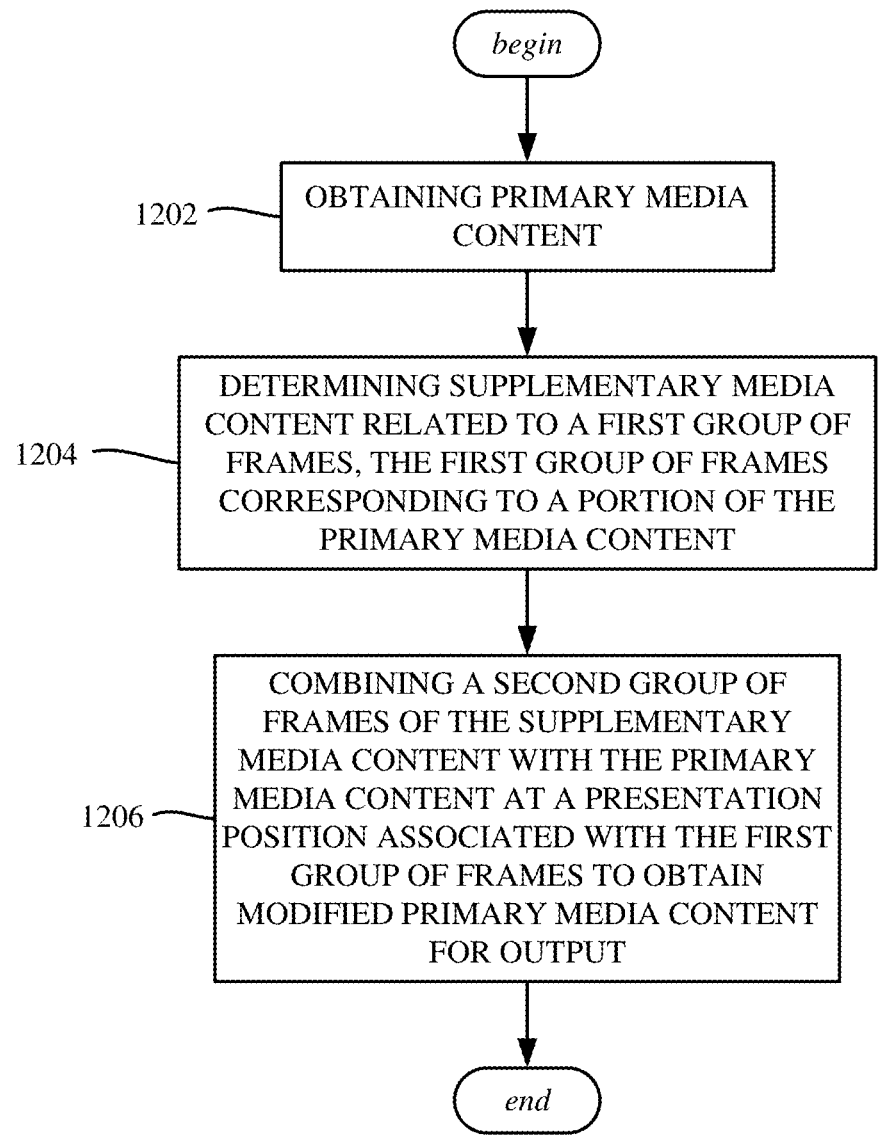
FIG. 12 is a flow diagram representing example operations related to combining supplementary media content with related primary media content at a presentation position associated with the first group of frames to obtain modified primary media content for output, in accordance with various aspects and embodiments of the subject disclosure.

One or more example aspects are represented in FIG. 12, and can correspond to a system, including a processor, and a memory that stores executable instructions that, when executed by the processor, facilitate performance of operations. Example operation 1202 represents obtaining primary media content. Operation 1204 represents determining supplementary media content related to a first group of frames, the first group of frames corresponding to a portion of the primary media content. Operation 1206 represents combining a second group of frames of the supplementary media content with the primary media content at a presentation position associated with the first group of frames to obtain modified primary media content for output.

Further operations can include outputting the modified primary media content to be rendered via a display device.

The first group of frames of the primary media content can correspond to a geographic location, and the second group of frames can be related to the first group of frames via an association with the geographic location.

The second group of frames of the supplementary media content can include user historical location data describing a past presence of the user at, or proximate to, the geographic location.

The second group of frames of the supplementary media content can include historical data of a past experience of a user.

The first group of frames of the primary media content can correspond to a theme, and the second group of frames can be related to the first group of frames via an association with the theme.

Combining the second group of frames of the supplementary media content with the primary media content can include inserting the second group of frames in a slot before the first group of frames.

Combining the second group of frames of the supplementary media content with the primary media content can include inserting the second group of frames in a slot after the first group of frames.

The first group of frames can correspond to a first visible region of a display device, and combining the second group of frames of the supplementary media content with the primary media content can include overlaying the second group of frames for simultaneous display on the display device in a second visible region that is smaller than the first visible region and is within the first visible region.

The first group of frames can correspond to a first visible region of a display device, and combining the second group of frames of the supplementary media content with the primary media content can include overlaying the second group of frames for simultaneous display on the display device in a second visible region that is proximate to the first visible region.

The supplementary media content can be first supplementary media content, and further operations can include combining second supplementary media content comprising audio with the primary media content at the presentation position associated with the first group of frames.

The primary media content can include at least one of: prerecorded video content, streaming video content, video game content, prerecorded audiovisual content, virtual reality content, augmented reality content, or streaming audiovisual content.

Figure 13:
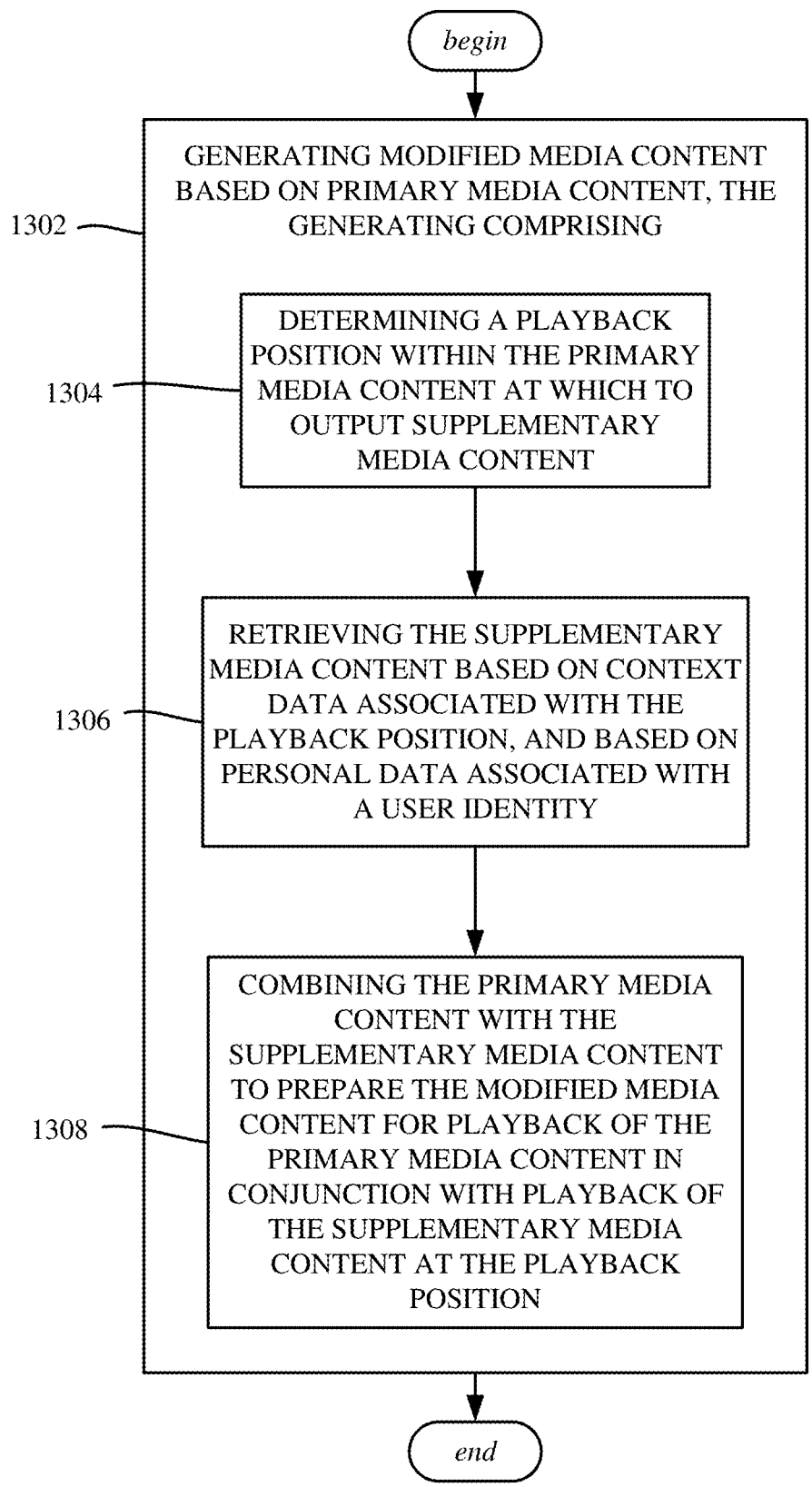
FIG. 13 is a flow diagram representing example operations related to combining the primary media content with supplementary media content based on context data associated with the primary media.

One or more aspects are represented in FIG. 13, such as implemented in a machine-readable medium, including executable instructions that, when executed by a processor, facilitate performance of operations. Example operation 1302 represents generating modified media content based on primary media content. The generating can comprise determining a playback position within the primary media content at which to output supplementary media content (operation 1304), retrieving the supplementary media content based on context data associated with the playback position, and based on personal data associated with a user identity (operation 1306), and combining the primary media content with the supplementary media content to prepare the modified media content for playback of the primary media content in conjunction with playback of the supplementary media content at the playback position (operation 1308).

The context data associated with the playback position can include location data, and retrieving the supplementary media content based on the context data and based on personal data comprises obtaining the supplementary media content from personal data media content associated with the user identity and associated with the location data.

The context data associated with the playback position can identify a theme, and retrieving the supplementary media content based on the context data and based on the personal data can include obtaining the supplementary media content based on the personal data and based on the theme.

As can be seen, the technology described herein facilitates keeping a user more interested in a media presentation by inserting supplementary content to which a user can personally relate into the media presentation. The supplementary content can be selected based on matching the user's historical/habitat data with data describing a portion of the primary content of the media presentation.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 14:
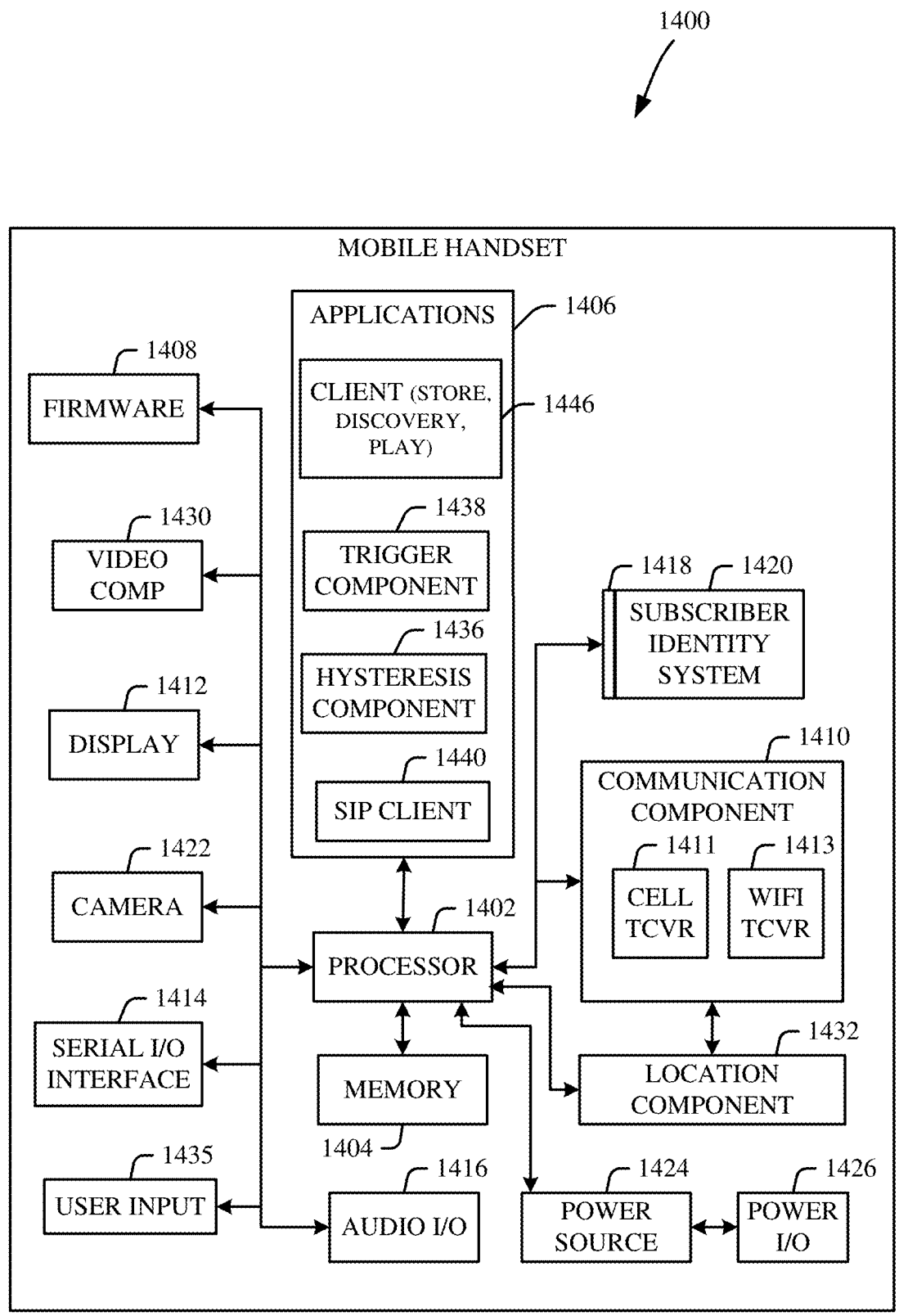
FIG. 14 illustrates an example block diagram of an example mobile handset operable to engage in a system architecture that facilitates wireless communications according to one or more embodiments described herein.

Referring now to FIG. 14, illustrated is a schematic block diagram of an example end-user device (such as user equipment) that can be a mobile device 1400 capable of connecting to a network in accordance with some embodiments described herein. Although a mobile handset 1400 is illustrated herein, it will be understood that other devices can be a mobile device, and that the mobile handset 1400 is merely illustrated to provide context for the embodiments of the various embodiments described herein. The following discussion is intended to provide a brief, general description of an example of a suitable environment 1400 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1400 includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1494) through a hardwire connection, and other serial input devices (e.g., a keyboard, keypad, and mouse). This supports updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the handset 1400, and updated by downloading data and software.

The handset 1400 can process IP data traffic through the communication component 1410 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1422 (e.g., a camera) can be provided for decoding encoded multimedia content. The video processing component 1422 can aid in facilitating the generation, editing and sharing of video quotes. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1438 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 810, includes an indoor network radio transceiver 1413 (e.g., Wi-Fi transceiver). This function supports the indoor radio link, such as IEEE 802.11, for the dual-mode GSM handset 1400. The handset 1400 can accommodate at least satellite radio services through a handset that can combine wireless voice and digital radio chipsets into a single handheld device.

Figure 15:
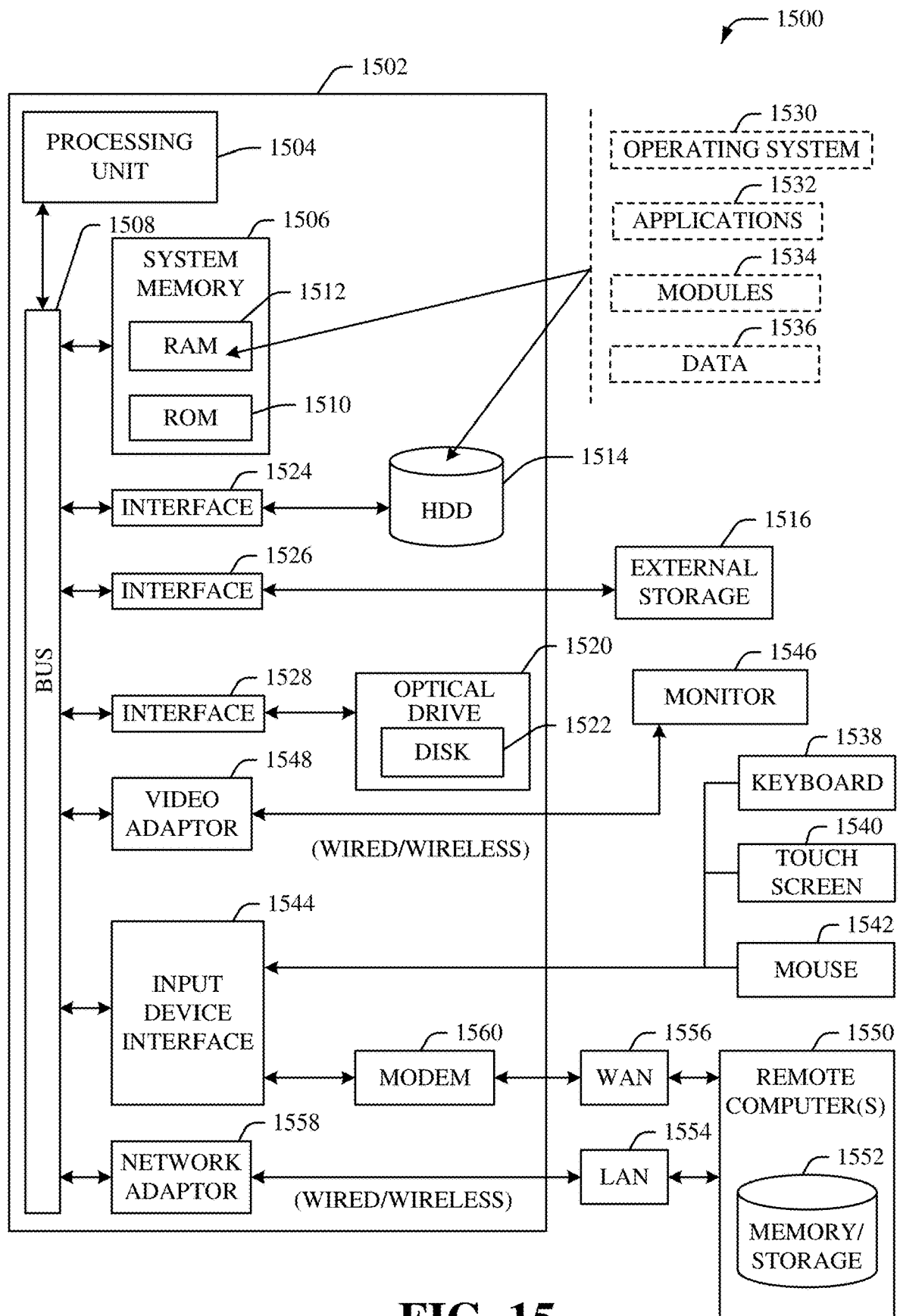
FIG. 15 illustrates an example block diagram of an example computer/machine system operable to engage in a system architecture that facilitates wireless communications according to one or more embodiments described herein.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD), non-volatile memory and other storage technology could be used in addition to, or in place of, an HDD 1514, and can be internal or external. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1494 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally include emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can include one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1494 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 15 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
   analyzing, by a system comprising a processor, primary media content being rendered to a user;
   based on the analyzing, determining, by the system, insertion slot data comprising location setting data and slot data describing a media insertion slot associated with frames of the primary media content, wherein the location setting data comprises geographical location data that describes a geographic location, scene data that describes a first scene, and time data that describes a first time of day;
   accessing, by the system, historical location data describing respective past presences of a person at respective past geographic locations, wherein the person has a defined relationship with the user;
   selecting, by the system, supplementary media content based on the insertion slot data and the historical location data, wherein the supplementary media content comprises recorded media of the person at the geographical location in a second scene that matches the first scene according to a first criterion and at second time of day that matches the first time of day according to a second criterion; and
   inserting, by the system, the supplementary media content into the media insertion slot identified by the slot data.

2. The method of claim 1, further comprising clipping, by the system, the supplementary media content to fit a time duration of the media insertion slot.

3. The method of claim 1, wherein the location setting data further comprises location type data that describes a type of location.

4. The method of claim 1, wherein the primary media content comprises video data, and wherein the supplementary media content further comprises audio data and does not comprise video data.

5. The method of claim 1, wherein the defined relationship is that the person is the user.

6. The method of claim 1, wherein the defined relationship is that the person is a relative of the user.

7. The method of claim 1, wherein the defined relationship is that the person is a friend of the user.

8. A system, comprising:
a processor; and
a memory that stores executable instructions that, when executed by the processor of the system, facilitate performance of operations, the operations comprising:
examining primary media content being output to a first user;
based on the examining, determining insertion slot data comprising location setting data and slot data describing a media insertion slot associated with frames of the primary media content, wherein the location setting data comprises geographical location data that describes a geographic location, scene data that describes a first scene, and time data that describes a first time of day;
obtaining historical location data describing respective past presences of a second user at respective past geographic locations, wherein the second user has a defined relationship with the first user;
selecting supplementary media content based on the insertion slot data and the historical location data, wherein the supplementary media content comprises recorded media of the second user being within a defined area of the geographical location in a second scene that matches the first scene according to a first criterion and at second time of day that matches the first time of day according to a second criterion; and
inserting the supplementary media content into the media insertion slot identified by the slot data.

9. The system of claim 8, wherein the operations further comprise clipping the supplementary media content to fit a time duration of the media insertion slot.

10. The system of claim 8, wherein the operations further comprise extending the supplementary media content to fit a time duration of the media insertion slot.

11. The system of claim 8, wherein the primary media content comprises video, and wherein the supplementary media content further comprises audio and does not comprise video.

12. The system of claim 8, wherein the defined relationship is that the second user is the first user.

13. The system of claim 8, wherein the defined relationship is that the second user has been designated as a family member of the first user.

14. The system of claim 8, wherein the defined relationship is that the second user has been designated as a friend of the first user.

15. A non-transitory machine-readable medium, comprising executable instructions that, when executed by a processor, facilitate performance of operations, the operations comprising:
monitoring primary media content being viewed by a first user;
based on the monitoring, determining insertion slot data comprising location setting data and slot data describing a media insertion slot associated with frames of the primary media content, wherein the location setting data comprises geographical location data that describes a geographic location, scene data that describes a first scene, and time data that describes a first time of day;
obtaining historical location data describing respective past presences of a second user at respective past geographic locations, wherein the second user has a defined relationship with the first user;
choosing secondary media content based on the insertion slot data and the historical location data, wherein the secondary media content comprises recorded media that comprises a recording of the second user being within the geographical location in a second scene that matches the first scene according to a first closeness criterion and at second time of day that matches the first time of day according to a second closeness criterion; and
inserting the secondary media content into the media insertion slot identified by the slot data.

16. The non-transitory machine-readable medium of claim 15, wherein the operations further comprise clipping the secondary media content to match a time duration of the media insertion slot.

17. The non-transitory machine-readable medium of claim 15, wherein the operations further comprise extending the secondary media content to match a time duration of the media insertion slot.

18. The non-transitory machine-readable medium of claim 15, wherein the defined relationship is an identity relationship representative of the second user being the first user.

19. The non-transitory machine-readable medium of claim 15, wherein the defined relationship is a family relationship representative of the second user being a relative of the first user.

20. The non-transitory machine-readable medium of claim 15, wherein the defined relationship is a friend relationship representative of the second user being a friend of the first user.

* * * * *